US005299126A

United States Patent [19]

Spraker

[11] Patent Number: 5,299,126

[45] Date of Patent: Mar. 29, 1994

[54] ELECTRONIC TIDE WATCH

[76] Inventor: Michael Spraker, 34519 Calle Naranja, Capistrano Beach, Calif. 92624

[21] Appl. No.: 425,282

[22] Filed: Oct. 23, 1989

[51] Int. Cl.[5] ........................ G06F 15/20; G04B 19/26

[52] U.S. Cl. ........................................ 364/420; 368/18

[58] Field of Search .................. 364/420, 900; 368/18, 368/19, 28

[56] References Cited

U.S. PATENT DOCUMENTS

| | | | |
|---|---|---|---|
| 3,745,313 | 7/1973 | Spilhaus | 235/88 |
| 4,396,293 | 8/1983 | Mizoguchi | 368/15 |
| 4,412,749 | 11/1983 | Showalter | 368/19 |
| 4,623,259 | 11/1986 | Oberst | 368/19 |
| 5,050,139 | 4/1991 | Oberst | 368/19 |
| 5,115,417 | 5/1992 | Saunders | 368/19 |

FOREIGN PATENT DOCUMENTS

| | | | |
|---|---|---|---|
| 60-171480 | 9/1985 | Japan | 368/19 |
| 60-250286 | 12/1985 | Japan | 368/19 |

OTHER PUBLICATIONS

Tide Watch Products, Inc. product literature for "The Tide Watch", copyright 1989.

Advertisement for Tide Watch from Surfing Magazine, vol. 26, No. 1, Jan. 1990.

Press release for Timex Victory Yachting Watch, The Register Newspaper, Jun. 1989.

Sales brochure for Krieger Tidal Chronometer.

*Primary Examiner*—Roy N. Envall, Jr.
*Assistant Examiner*—A. Bodendorf
*Attorney, Agent, or Firm*—Stetina and Brunda

[57] ABSTRACT

An electronic tide watch comprising a memory for storing a table of tide times, heights, and geographic offsets, an input circuit for entering times, dates, and geographic offsets, a processing circuit for identifying stored tide information corresponding to an input time and date, and a display for showing selected tide times and heights.

16 Claims, 7 Drawing Sheets

ELECTRONIC TIDE WATCH

FIELD OF THE INVENTION

The present invention relates generally to devices for predicting the times of future high and low tides, and more particularly to an electronic tide watch comprising a memory for storing a table of tide times, heights, and geographic offsets, an input circuit for entering times, dates, and geographic offsets, a processing circuit for identifying stored tide information corresponding to input time and date information, and a display for showing selected tide times and heights. The electronic tide watch displays the tide height for a selected date and time using the National Oceanic and Atmospheric Administration's data which takes into account such factors as seasonal changes, average climate, geography, and celestial influences.

BACKGROUND OF THE INVENTION

In order to obtain information about the heights and times of future tides, tide tables, such as those produced by the National Oceanic and Atmospheric Administration must be consulted. These tide tables are constructed to provide tide information at various locations along given coastlines. In general, to obtain tide information at one of the specific locations for which tide information is available, two different tables must be consulted. A table of baseline tide information is first consulted. This table of baseline information provides the tide time and tide height on different dates for a single baseline location along the coastline for which the particular table is constructed.

If the location for which tide information is desired is the baseline location (for which tide information is provided), then the tide information is taken directly from the table of baseline information and the second table does not need to be consulted. Most often, however, tide information is desired for locations other than the baseline location. To avoid having to compile complete tide tables for every location along a given coastline, the National Oceanic and Atmospheric Administration has compiled a complete tide table only for a baseline location, along each major coastline, and then provides offsets for other locations along that coastline. These offsets include a time offset, a high tide height offset, and a range. The time offset is the difference in hours and minutes between when a tide occurs at the baseline location and when the same tide occurs at the location for which the offset applies. A positive time offset indicates that the tide occurs at the offset location later than at the baseline location. A negative time offset indicates that the tide occurs at the offset location earlier than at the baseline location. The high tide height offset is the difference in feet between the height of a high tide at the baseline location and the height of a high tide at the location for which the offset applies. The range is the difference between the height of the high tide and the height of the low tide, at the offset location. Therefore, given the height of the high tide at the baseline location, the high tide offset, and the range, then the height of both the high and low tides can be calculated for the offset location.

Therefore, after the baseline information is found in the first table, then offsets are found in a second table. These offsets are applied to the baseline tide information to get the correct tide information for the required location.

For example, a 1988 tide table which purports to be "for the coast of Southern California" provides the following baseline values for Monday, Nov. 21, 1988:

| HIGH TIDE | | | | LOW TIDE | | | |
|---|---|---|---|---|---|---|---|
| AM | Ht. | PM | Ht. | AM | Ht. | PM | Ht. |
| 6:57 | 7.1 | 8:55 | 4.6 | 12:35 | 1.1 | 1:52 | −1.0 |

Where AM and PM are the respective times of day and Ht. is the height of the tide in feet. Note that each tide, high and low, occurs twice each day. This tidal information is only accurate for a single specific geographic location somewhere along the coast of Southern California, such as Los Angeles. If the user of the table is interested in obtaining precise tidal data for a different specific location, such as Muertos Bay, Calif. then the following offsets must be applied to the above-shown tidal times and heights:

| | Time of Tide (h/m) | Height of High Tide (feet) | Range of Tide (feet) |
|---|---|---|---|
| Lower California Muertos Bay | −0:45 | 0.65 | 2.8 |

where h/m is the time in hours and minutes and the height of the low tide is equal to the height of the high tide minus the range. Similarly, if the user of the table is interested in a more northerly location, such as San Clemente, Calif., the following different offsets would be applied to the tabular data:

| | Time of Tide (h/m) | Height of High Tide (feet) | Range of Tide (feet) |
|---|---|---|---|
| California San Clemente | −0:18 | 0.91 | 3.7 |

Accordingly, in order to obtain accurate tidal data for specific coastal locations, a certain amount of mathematical manipulation of the available tabular data is required. Moreover, in order to make use of the tide tables, one must keep a tide table book on his person or at some readily accessible place so as not to be without the necessary information when it is needed.

Tide information is important to marine navigators, boaters, fishermen, and coastal dwellers. Many activities, particularly those of commercial vessels, require planning weeks or more in advance. Deep draft ships, for instance, may only use certain waterways during high tide. Therefore, it is necessary for these navigators to consult tide tables such as those produced by the National Oceanic and Atmospheric Administration. Frequently, persons planning recreational events have no access to tide information and rely solely upon chance in scheduling. However, if the fishing, for example, is always better in a certain area at high tide, then it makes sense to plan the fishing trip in advance so that the fishing will take place when the tide is high.

An explanation of the many factors affecting tide heights and times is important to this invention because the prior art neglects to take into consideration all of these factors in determining tide times, whereas the present invention does consider all of these factors.

Tides are caused primarily by the gravitational forces of the sun and the moon acting upon the earth's oceans. Because the moon is closer to the earth than the sun, its influence is approximately twice as great as the sun's. The combined gravitational forces of the sun and the moon cause the oceans of the earth to bulge on diametrically opposite sides of the earth. The height of the water in this bulge is greater than in the surrounding non-bulging areas, therefore we have tides. The actions of the sun and moon result in tides having a duration of twelve hours and twenty-five minutes between highs. Because a flood tide is approximately five hours in duration and an ebb tide is approximately seven hours in duration, this results in a time of approximately six hours and thirteen minutes between a high tide and its next low tide.

In addition to the effects of the sun and moon, tides are also affected by seasonal changes, climate, and geography. Seasonal changes cause variations in the tides because the distance between the sun and the earth changes during the year. Climate affects tides on a daily basis as barometric pressure and winds affect the flow of water upon the earth's surface. Geography is a major consideration because the tidal bulge varies from place to place upon the earth's surface. Therefore, the amount of tide experienced at any given moment depends upon the exact location considered.

All of the prior art devices operate strictly by calculating the time of the next high or low tide based upon the relation of tide times to chronological time.

Tides in their diurnal cycle, occur each time slightly later in the day. The delay is approximately 25 minutes for each individual cycle. That is about 50 minutes for a complete diurnal cycle in a 24-hour period.

For example, if a high tide occurred at 12:00 noon on Saturday, then the next high tide would be at 12:25 midnight and the following high tide would occur at 12:50 Sunday afternoon.

As is evident from the above discussion, tide occurs on a regular basis and on a schedule where the time between tides is a constant ratio to chronological time. This ratio, which is determined by celestial factors, is 57/59. It is this ratio that prior art devices use to calculate the time of the next high or low tide. Other factors, such as seasonal changes, climate, and geography are not considered at all by prior art devices.

Mechanical watches are well known which indicate both the present time and the time of the next high or low tide. U.S. Pat. No. 4,035,617, issued to Banner, discloses a typical prior art mechanical watch wherein the clock face has a high tide and a low tide indication. The high tide indication is at the 12 o'clock position and the low tide indication is at the 6 o'clock position on the watch face. A third hand, which is operated by the clock movement, indicates whether the next tide is to be high or low by pointing to the appropriate tide indication on the watch face.

U.S. Pat. No. 4,412,749 issued to Showalter, discloses an electronic clock which alternately displays the present time and the time of the next high or low tide. Whether the next tide will be high or low is indicated by a colored light.

Neither prior art mechanical watches nor the prior art electronic clock provides a convenient indication of tide times in the future. The prior art devices only indicate the time of the next high or low tide. While knowing the time of the next high or low tide is certainly useful, it does not help in planning beyond a few hours into the future.

Neither prior art mechanical watches nor the prior art electronic clock provides any indication of tide height. Knowledge of future tide height can be crucial to some users. For instances, a deep draft ship may require a minimal tide height in certain waterways.

Although the prior art has recognized to a limited extent the need to have tide information readily accessible, the proposed solutions have to date been ineffective in providing a satisfactory remedy. Therefore, there exists a substantial need in the art for an improved tide-indicating device.

SUMMARY OF THE INVENTION

The present invention comprises a memory for storing a table of tide times, heights, and geographic offsets, an input circuit for entering times and geographic offsets, a processing circuit for identifying stored tide information corresponding to input time and date information, and a display for showing selected tide times and heights. The electronic tide watch displays the tide height for a selected date and time using the National Oceanic and Atmospheric Administration's tide data which takes into account such factors as seasonal changes, average climate, geography, and the celestial influences which give rise to the ratio upon which prior art devices operate.

The present invention therefore provides both the time and height of both the present and future tides. It corrects this information for geographic location. The tide information provided by the present invention takes into account all factors available from historic data, such as that provided by the National Oceanic and Atmospheric Administration, including seasonal changes, average climate, geography, and celestial factors.

These, as well as other future objects and advantages will be apparent from the following description and drawings. It is understood that changes in the specific structure shown and described may be made within the scope of the claims without departing from the spirit of the invention.

DETAILED DESCRIPTION OF A PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiments. It is understood, however, that the same or equivalent functions and sequences may be accomplished by different embodiments that are also intended to be encompassed within the spirit and scope of the invention.

The structure and operation of the electronic tide watch of the present invention is illustrated in FIGS. 1 through 7 which depict a preferred embodiment of the invention.

Figure 2:
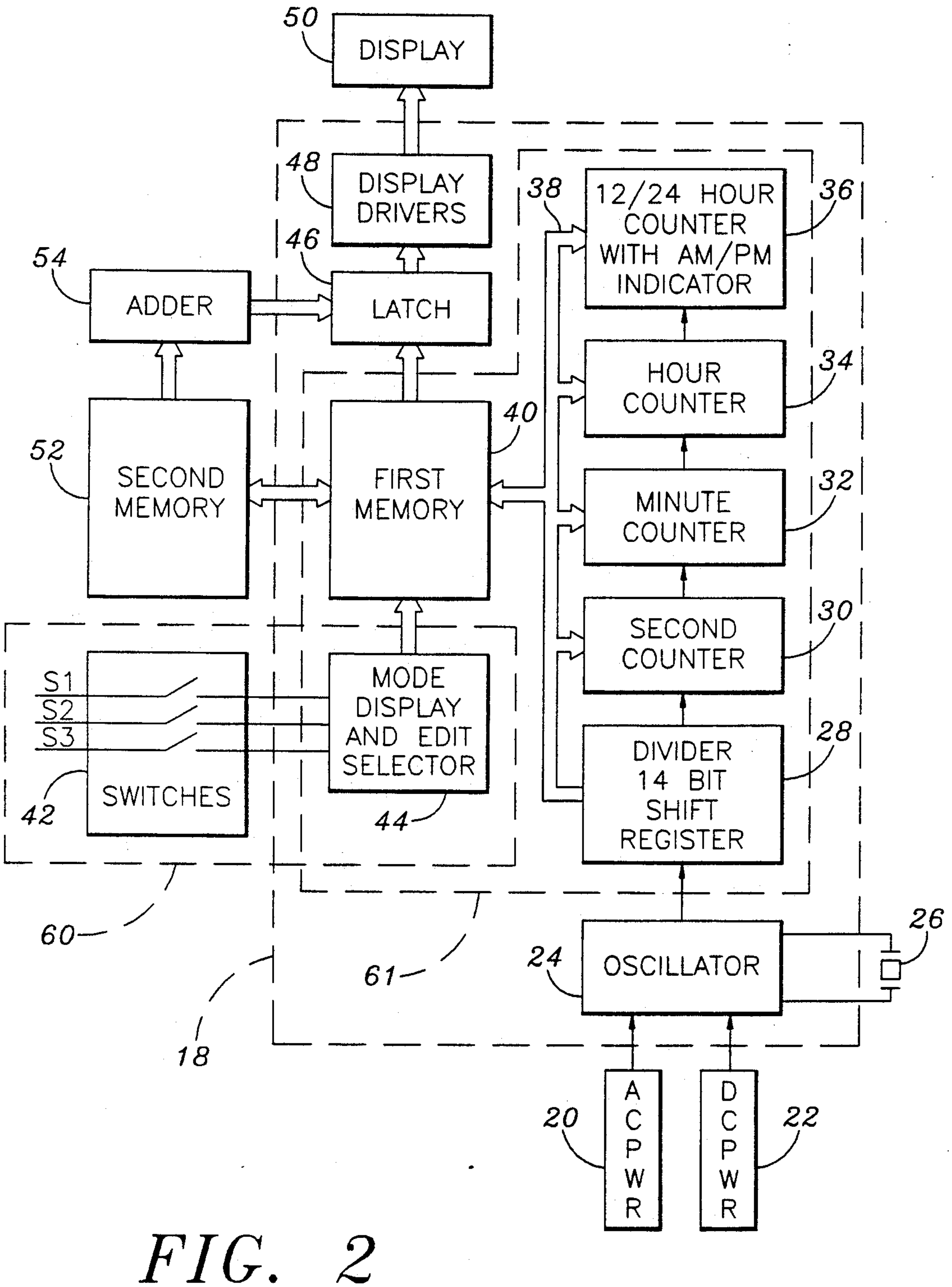
FIG. 2 is a block diagram of the electronic tide watch.

Referring to FIG. 2, a first memory 40 stores information representative of tide times and tide heights for a given geographic area along a particular coastline. The information stored in normal memory 40 will consist of tide times, tide dates, and tide heights for a predetermined period of time. The length of this period of time depends upon the size of the memory used. This stored tide information serves as the baseline tide time and tide height information to which correction factors must be applied to obtain the tide time and tide height information for any other geographic location along the same coastline. An input circuit 60 is comprised of the switches 42 and the mode display and edit selector 44 and is shown by a dotted line around the switches 42 and the mode display and edit selector 44 of FIG. 2. This input circuit 60 permits the user to input time and date information for which corresponding tide time and tide height information is desired. A processing circuit 61 is comprised of the first memory 40, the mode display and edit selector 44, and the counters 28, 30, 32, 34, and 36. The processing circuit 61 identifies the stored tide time and tide height information corresponding to the input time and date information. A display 50 illustrates the identified tide time and tide height information. The display is driven by drives 48, although an LCD display with internal drivers may be used.

A second memory 52 stores information representative of offsets in tide time and tide height for a second geographic area. These offsets must be applied to the baseline tide time and tide height information stored in the first memory 40 to obtain the predicted tide time and tide height for a particular geographic location. This particular geographic location is that location for which tide times and tide heights are desired. It is a location for which offsets have previously been entered and must be located along the same coast for which the baseline tide information is stored in first memory 40. The processing circuit 61 is operative to retrieve information from the second memory 52 and to use the retrieved information to effect the identified time and tide height information.

A third and additional memories (not shown) can be used for storing information representative of offsets in tide times and heights at other geographic areas. The input circuit 60 would then be operative to selectively access the third and additional memories in accordance with input geographic information designating the geographic area for which tide time and tide height information is desired. That is, the user could then designate which geographic location's offsets are to be applied to the baseline tidal information stored in first memory 40. The processing circuit 61 can then be used to retrieve information from such third and additional memories and to use the retrieved information to affect the identified tide time and tide height information from the first memory 40.

Figure 4:
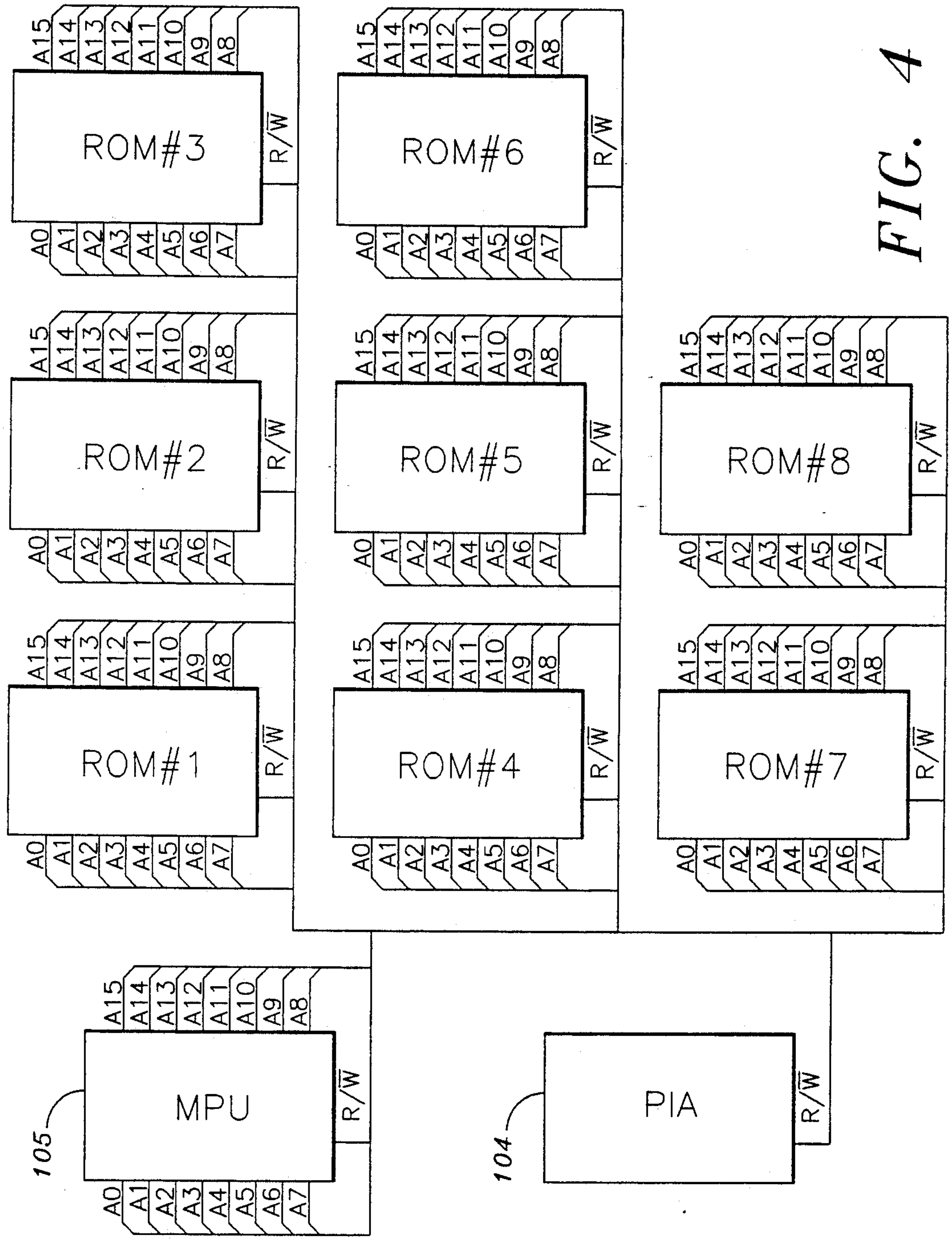
FIG. 4 is a schematic diagram of the memory addressing interconnections.
Figure 5:
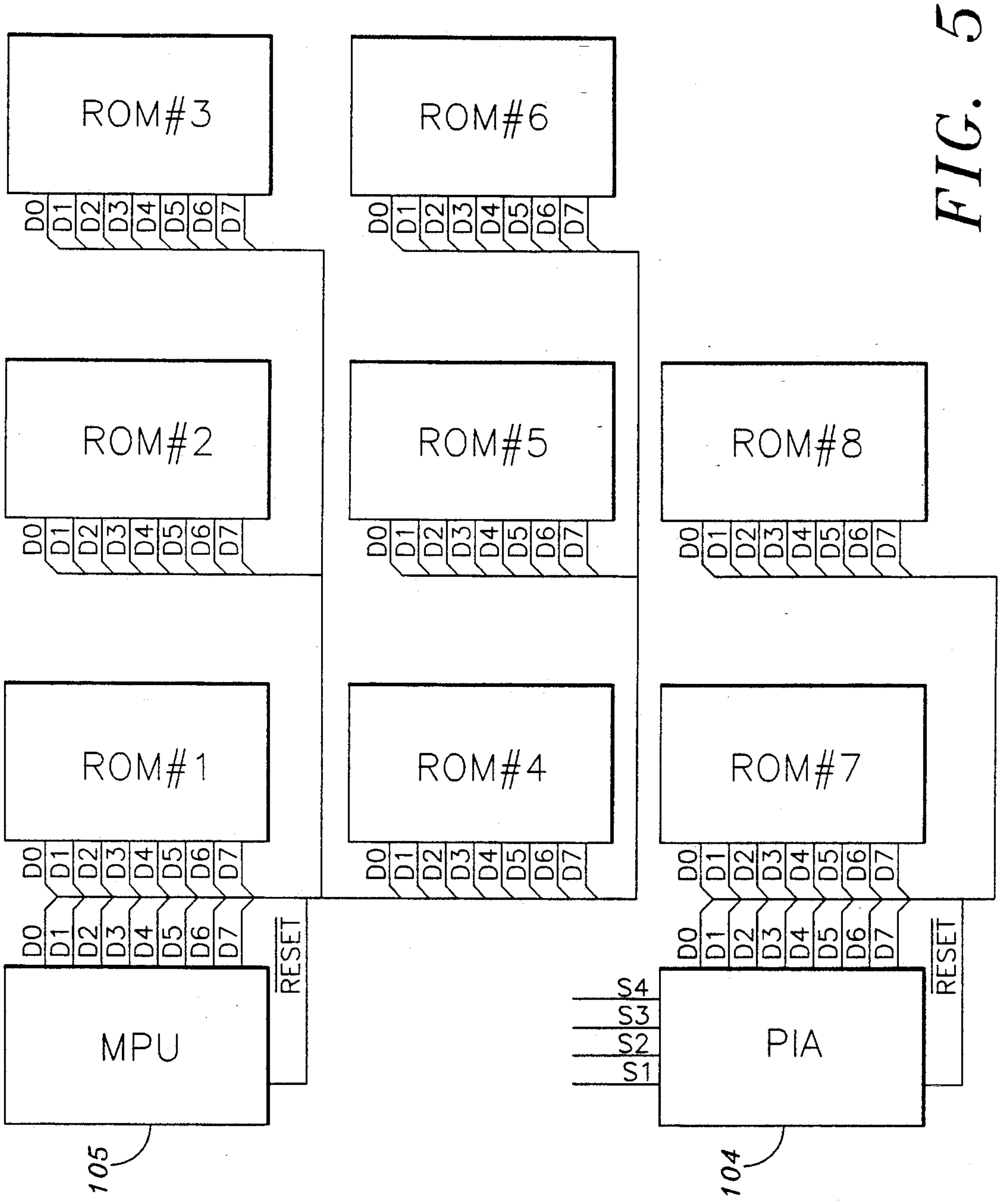
FIG. 5 is a schematic diagram of the memory data interconnections.

All of the processing circuitry enclosed in dashed box 18 except for the display drivers 48 and also including the second memory 52 and adder 54 can be replaced with a single 64k bit microprocessing unit (MPU). The MPU is preferably a custom chip similar in function to a Motorola MC6802. It will be capable of addressing 64k bytes of memory and utilize a 16 bit address bus. The 64k bytes of memory may be addressed using eight 8k chips as shown in FIG. 4 and the data may be bused as shown in FIG. 5. The R/W signal enables either reading or writing to the memory chips. Those skilled in the art will recognize that other configurations are possible.

Figure 6:
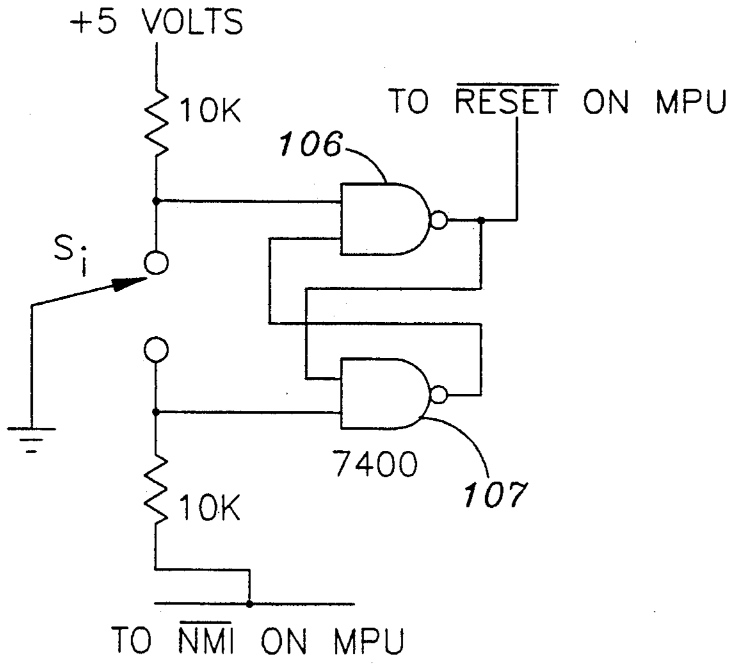
FIG. 6 is a schematic diagram of the debounce circuit.
Figure 7:
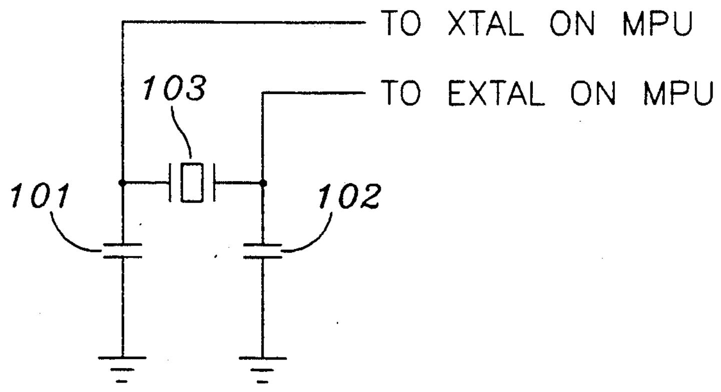
FIG. 7 is a schematic of the clock oscillator circuit.

Switches 42, mode display and edit selector 44, and latch 46 may be replaced with a single peripheral interface adapter (PIA) which will interface signals from outside (i.e. signals input from the switches 42) and which will provide signals to the display drivers 48. The PIA could be a custom chip similar in function to the Motorola MC6821. FIGS. 5 and 6 illustrate the interconnection of the PIA to the memory addressing and data buses. Several times a second the MPU would address the PIA to determine if any of the switches S1, S2, or S3 of 42 have been pushed. A standard debounce or delay circuit such as that illustrated in FIG. 6 could be used to eliminate the problems associated with switch contact bounding and noise to insure that the correct state of the switches 42 is sensed by the PIA 104 and communicated to the MPU 105.

NMI is a non-maskable interrupt which is active at logic state zero as indicated by the bar in FIG. 6. When NMI is pulled low by one of the switches $S_1$–$S_3$ the MPU will complete the instruction that it is presently executing and then acknowledge the interrupt caused by the switch. An NMI cannot be inhibited by software. The RESET signal output by NAND gates 106 and 107 of the debounce circuit places the MPU in a predefined state so that it can act upon an interrupt triggered by one of the switches $S_1$–$S_4$.

The processing circuit 61 is normally operative to identify the present time and the time and height of the next tide. The present time information will come from the counters 30, 32, 34, and 36. The time and height of the next tide will be generated in the same manner as described above for generating tide time and tide height information in response to input time and date information.

The tide watch can be operated to sequentially identify the times of succeeding high and low tides and the height of the succeeding high and low tides by operating the switches 42 as discussed below.

According to the present invention tidal times, heights, and geographic offsets, such as those produced by the National Oceanic and Atmospheric Administration, may be stored in a first memory 40. Switches S1, S2, and S3 operate an input circuit 60 to provide for updating present time and date and entering the time and date for which future tide time and height is to be displayed. Geographic offsets are also entered with these switches S1, S2, and S3. A display 50 normally shows the present time and date as well as the time and height of the nearest tide. The tide time and height displayed are the time and height of the high or low tide which is closest in time to the present or requested time. A previous tide's time and height will be displayed if that tide is closer in time to the present or requested time than the time of the next tide.

If the time of the tide to be checked is unknown, then pressing switch S3 will advance the display through future high and low tides sequentially. Each time a tide is displayed, both the time of the tide and its height will be shown in the display 50.

Each major coastline has its own set of tide data. It is this tide data, which includes tide times and heights for a selected location on that coast, which is stored in the first memory 40. Tide data for more than one coast can alternatively be stored in the first memory 40. In this case the correct data set is specified by using the switches S1, S2, and S3 of the input circuit 60 to specify the tide data for a specific coast. This may be accomplished at the same time that the geographic offsets are entered.

Offsets, for various geographic locations along any given coastline for which baseline tide data is stored in normal memory 40, can be stored in the additional memory as discussed above. In this case, the correct offsets are specified in the same manner that the tide data set for a particular coast was specified. That is, by using switches S1, S2, and S3 of the input circuit 60 to specify the offsets for a particular geographic location on a given coastline.

As shown in FIG. 2, a DC power supply 22 is connected to an oscillator 24. When the present invention is embodied in a tabletop unit an AC power supply 20 can also be utilized. The DC power supply 22 can then either be omitted or can operate as a backup power supply in case of line power failure. Internal timing signals are generated by the oscillator 24 in conjunction with the crystal 26. The crystal can be a SaRonix part number NMP040 1MHz crystal. A schematic diagram of the crystal circuit is provided in FIG. 7. Capacitors 101 and 102 provide a current delay to cause positive feedback, thus forming an oscillator circuit with crystal 103. XTAL and EXTAL are the two oscillator outputs used to clock the MPU. The output of the oscillator 24 is fed into a divider 28. The divider 28 generates a signal that is fed to a second counter 30, once per second. The divider 28 is a 14-bit shift register, which matches the natural frequency of the crystal used to the frequency required by the second counter 30. The nominal frequency of the crystal 26 is 32,768 Hertz. An oscillator frequency of 32,768 Hertz used in conjunction with a 14-bit shift register results in the register's output signal having a frequency of 1 pulse per second. The shift register 28 is initially loaded with all 1's giving it the value of 32,768. This is because 32,768 is 2 to the 14th power. The shift register is then decremented once for each oscillator pulse. When the shift register contains all 0's, after receiving 32,768 pulses from the oscillator, then the shift register outputs a single pulse to the second counter 30. The number 32,768 is then again loaded into the 14-bit shift register and the process repeats. The second counter 30 outputs a pulse once every second. The output of the second counter 30 is fed into a minute counter 32. After receiving 60 pulses from the second counter 30, the minute counter 32 increments one step and outputs a pulse to the hour counter 34, to which it is connected. After receiving 60 pulses from the minute counter 32, the hour counter 34 increments one step and outputs a pulse to the 12/24-hour counter 36, to which it is connected. The AM/PM indicator will increment once every 12 hours. That is, once every 12 pulses from the hour counter. The second counter 30, the minute counter 32, the hour counter 34, and the 12/24 hour counter 36 are all connected to a buss 38. The buss 78 connects each of these counters to a first memory 40 where the tide times and heights for a predetermined duration of time are stored.

The first memory 40 taken together with the bus 38, the counters 30, 32, 34, and 36, and the mode display and edit selector 44 comprise a processing circuit 61 which accepts time and date information from either the counters 30, 32, 34, and 36 or the mode display and edit selector 44, whichever is specified by the mode display and edit selector 44. This time and date is the time and date for which a tide time and height are to be provided and displayed. The processing circuit 61 correlates a time and date for which tide information is desired to the tide time and height that is predicted to occur on that given time and date. The correlation process is accomplished by matching the time and date for which tide information is desired to a stored tide time and height whose time is closest to the accepted time on the accepted date.

All of the components of FIG. 2 are sized to fit within the housing of a wristwatch.

EXAMPLE 1

When the present time and date, as well as the present tide time and height, are being displayed, then present time is supplied to the first memory 40 from the counters 28, 30, 32, 34, and 36. The present tide time and height is provided by the processing circuit 61.

If this present time is 12:00 AM, then the tide time and height stored in first memory 40 that occurs closest to 12:00 AM on the present date will be correlated to the present time of 12:00 AM. If, according to the stored table in first memory 40, a high tide had just occurred at 11:47 AM and a low tide is due at 6:10 PM, then the previous high tide at 11:47 AM would be the closest time in the stored table of first memory 40 to the present time of 12:00 AM. The time of 11:47 AM and its corresponding stored tide height as supplied by the processing circuit 61 will be displayed.

The processing circuit 61 outputs either the present date and time or the date and time for which future tide information is desired to the latch 46. The output of the display drivers 48 is fed into a display 50.

Switches 42 are connected to a mode display and edit selector 44. The mode display and edit selector 44 senses the position of the switches 42 and provides an output to the first memory 40. This output from the mode display and edit selector determines whether the present time, date, tide time, and tide height; a future time, date, tide time, and tide height; or the geographic offsets are displayed.

Second memory 52 is used to store the geographic offsets and is connected to first memory 40. The second memory 52 need not necessarily be a separate physical device from the first memory 40. The second memory 52 may reside within the same device as the first memory 40 if the device chosen has sufficient capacity. The output of second memory 52 is provided to adder 54 where the stored geographic offsets from second memory 52 are applied to the stored tide times and heights from first memory 40. The adder 54 outputs corrected tide time and height information to the latch 46.

When a time and date are specified by the switches 42, the time and date specified are provided by the input circuit 60 to the processing circuit 61 where the corresponding tide time and tide height are correlated to the specified future time and date. This information is then supplied to the second memory 52 where the geographic offsets are stored. The adder 54 applies the geographic offsets from the second memory 52 to the time and height.

S1, S2, and S3 of the switches 42, together with the mode display and edit selector 44 comprise an input circuit 60 through which the present time and date can be set, geographic offsets can be entered, and the date and time for which a future tide is to be checked can be entered.

An example of the application of offsets to store tide time and heights by the adder 54 may useful to an understanding of the present invention.

EXAMPLE 2

Assume that tidal information is required for Muertos Bay, Calif. on Nov. 21, 1988 at 12:00 AM. This is on the North American West Coast, consequently the first memory will contain tide time and heights for Los Angeles. If tide information were desired for Los Angeles, then no offsets would be required. That is, the geographic offsets for Los Angeles will be 0:00 time and 0.0 foot in height. The geographic offsets for Muertos Bay are −0:45 time and 0.65 foot height with a range of 2.8 feet. This means that the high tide at Muertos Bay occurs 45 minutes earlier than in Los Angeles and is, on the average, 0.65 foot higher. The low tide also occurs 45 minutes earlier than in Los Angeles and is, on the average, 2.8 feet lower than the high tide. When the tide information for 12:00 AM on Nov. 21, 1988 is correlated by the processing circuit 61, the tide time of 1:52 PM and the tide height of −1.0 foot are retrieved from the first memory 40. This is the tide time and height that would occur at Los Angeles on Nov. 21, 1988 at 12:00 AM. It is the uncorrected tide time and height. In the second memory 52 the geographic offsets of −0.45 time and −2.15 height are stored. They are applied by the adder 54 to the time of 1:52 PM and the height of −1.0 foot provided by the first memory 40.

A correction factor of −2.15 feet for tide height is used because the tide at 1:52 PM will be a low tide. The high tide correction factor is 0.65 foot. To obtain the low tide correction factor it is necessary to subtract the range of 2.8 feet from the high tide correction factor. This gives a low tide correction factor of −2.15 feet. Therefore, the corrected tide information displayed for Muertos Bay is 1:07 PM (1:52 PM−0:45) and −3.15 feet (−1 foot−2.15 feet).

The geographic offsets, as specified by the mode display and edit selector 44 and provided by the adder 54 can also be supplied to the latch 46 to be displayed.

Additionally, tide information which is available from the National Oceanic and Atmospheric Administration for other major coastlines, such as the North American East Coast, could be stored in the first memory 40, or alternatively could be stored in other memories if the first memory 40 does not have sufficient capacity. Geographic offsets could then be entered which would enable the user to obtain tide information on those additional coastlines.

Figure 1:
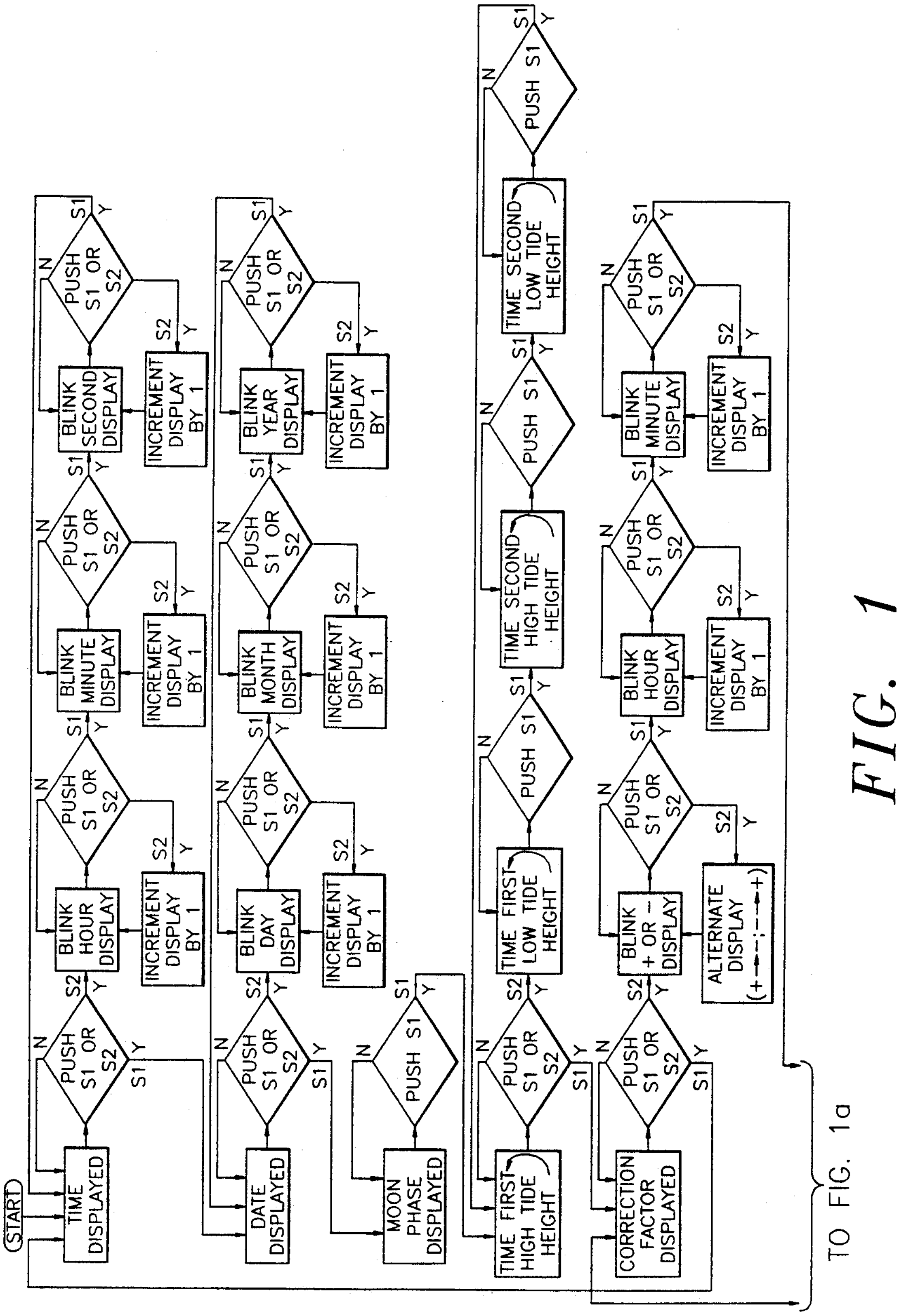
FIG. 1 is a flow diagram of the steps required to input a time and date, and to display a tide time and height.

FIG. 1 is a flow chart for programming the present time and date. For example, to change the present time, begin with the time displayed and push S2. This will cause the hour display to blink. Pushing S2 again will cause the hour display to increment by one hour for each time S2 is pushed. S2 is pushed until the correct hour is displayed. Then S1 is pushed to cause the minute display to blink. Pressing S2 causes the minute display to increment by 1 minute. Continue pressing S2 until the correct minute is displayed. Next push S1 to cause the second display to blink. Pressing S2 will cause the display to increment by 1 second. Continue pressing S2 until the correct second display is shown. Pressing S1 again will return you to the current time being displayed. Changing the present date is performed in a similar manner according to the flow chart of FIG. 1.

Figure 1A:
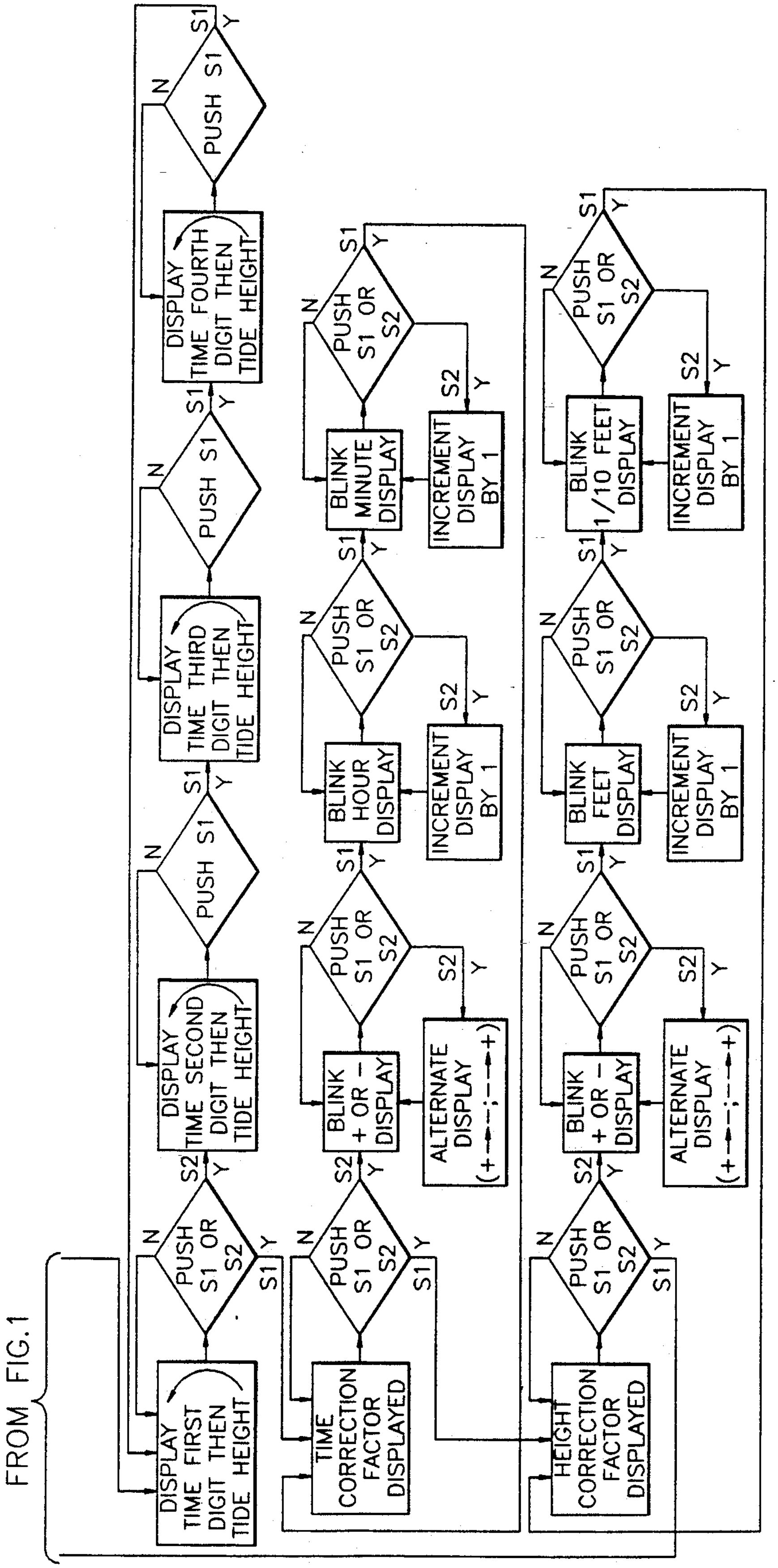
FIG. 1A is a flow diagram of the steps required to input geographic offsets.

FIG. 1A is a flow chart which illustrates the entry of geographic offsets. For example, pressing S1 after a tide height has been displayed causes the time correction factor to be displayed. Pressing S2 then displays a plus and minus sign. Pressing S2 again alternates the display between plus and minus. The correct sign is entered for the appropriate time correction factor which can be either positive or negative. Pressing S1 causes the hour display to blink. The geographic time correction factor is then entered in the same manner as described for the present time in FIG. 1.

Figure 3:
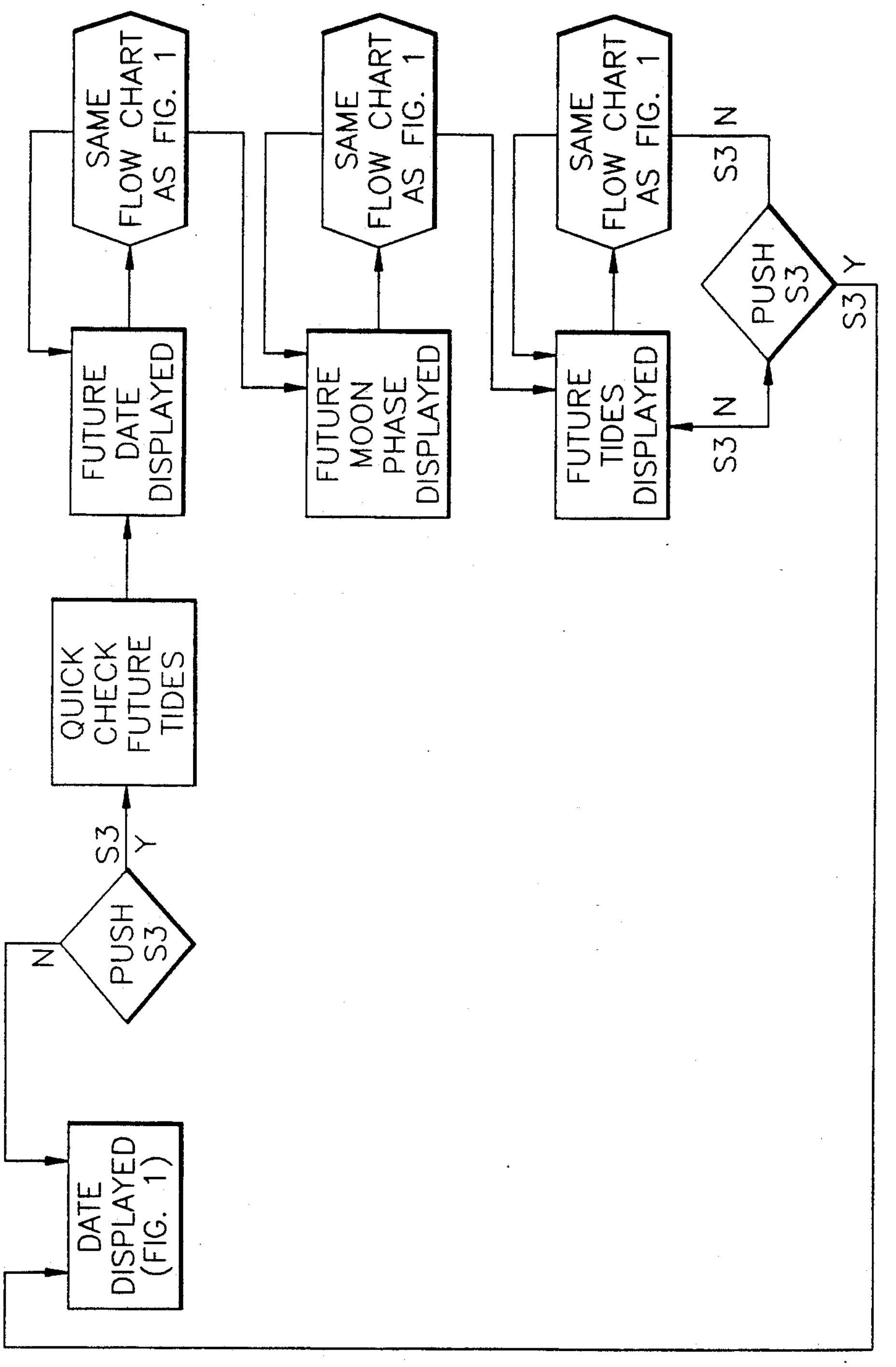
FIG. 3 is a flow diagram of the steps required to input a future time and receive a display of the corresponding future tide time and height.

The display 50 normally shows the present time and date as well as the tide time and tide height of the nearest tide. FIG. 3 is a flow chart which illustrates the method for checking the height of the tide at a future time and date. First the date is displayed, as can be accomplished per the flow chart of FIG. 1, then push S3 and enter the future date of interest. Once the future date has been entered, the future moon phase can also be displayed as given in FIG. 1. Next enter the time in the same manner. Pressing S1 causes the future tide time and tide height to be displayed. Pressing S3 will cause the present date display to reappear.

Thus, these and other modifications and additions may be obvious to those skilled in the art and may be implemented to adapt the present invention for use in a variety of different applications.

What is claimed is:

1. A device for providing future tide times and heights comprising:

(a) a first memory for storing a table of information representative of tide time and tide heights predicted to occur during a predetermined period and at a first geographic area;

(b) an input circuit for inputting time and date information for which corresponding tide time and tide height information is desired;

(c) a processing circuit in electrical communications with said first memory and said input circuit for identifying the stored tide time and tide height information corresponding to the input time and date information; and (d) a display in electrical communication with said processing circuit for illustrating the identified tide time and tide height information.

2. The device as recited in claim 1 wherein said display is further operative to illustrate the input time and date information.

3. The device as recited in claim 1 further comprising:

(a) a second memory for storing information representative of offsets in tide time and tide height for a second geographic area; and (b) wherein said processing circuit is operative to retrieve information from said second memory and to use said retrieved information to modify the identified time and tide height information from said first memory.

4. The device according to claim 3 further comprising:

(a) a third memory for storing information representative of offsets in tide times and heights at a third geographic area; and (b) wherein said input circuit is operative to selectively access said second and third memories in accordance with input geographic information designating a geographic area for which tide time and tide height information is desired;

(c) wherein said processing circuit is operative to retrieve information from said second and third memories and to use said retrieved information to modify the identified tide time and tide height information from said first memory.

5. The device as recited in claim 4 wherein said processing circuit is normally operative to identify a present time and a time and height of a next tide.

6. The device as recited in claim 5 wherein said processing circuit is operative to sequentially identify times of succeeding high and low tides and the heights of the succeeding high and low tides.

7. The device as recited in claim 1 wherein said first memory, said input circuit, and processing circuit, and said display are sized to fit within a wristwatch.

8. A method for providing predictions of tidal times and heights according to the steps of:

(a) storing in an electronic memory a table of information representative of tide times and tide heights predicated to occur during a predetermined period and at a first geographic area;

(b) inputting into an electronic processing circuit time and date information for which corresponding tide time and tide height information is desired;

(c) identifying with the electronic processing circuit the stored tide time and tide height information corresponding to the input time and date information; and (d) displaying the identified tide time and tide height information.

9. A method for providing predictions of tidal time and heights according to claim 8 further comprising the steps of:

(a) storing in an electronic memory information representative of offsets in tide time and tide height at a second geographic area; and (b) retrieving stored information representative of the offsets in tide time and tide height at the second geographic area and using said retrieved information to modify the identified tide time and tide height information.

10. A method for providing predictions of tidal times and heights according to claim 9 further comprising the steps of:

(a) storing information representative of offsets in tide time and tide height at a third geographic area;

(b) selectively accessing said stored information representative of offsets in tide time and tide height at said second and said third geographic areas in accordance with input geographic information corresponding to a geographic area for which tide time and tide height information is desired; and (c) retrieving stored information representative of offsets in tide time and tide height selected from said second and third geographic areas and using said retrieved information to effect the identified tide time and tide height information.

11. A method as recited in claim 9 further comprising the step of sequentially displaying times at which succeeding high and low tides occur.

12. The device as recited in claim 1 wherein said first memory and said processing circuit comprise a microprocessing unit.

13. The device as recited in claim 12 wherein said microprocessing unit further comprises a 16 bit address bus and addresses 64 k bytes of memory.

14. The device as recited in claim 1 wherein the information stored in said first memory is representative of National Oceanic and Atmospheric Administration tide data.

15. The device as recited in claim 1 wherein said first memory, said input circuit, said processing circuit and said display are disposed within a watch.

16. The method as recited in claim 8 wherein the step of storing in an electronic memory information representative of tide times and tide heights comprises storing in an electronic memory information representative of National Oceanic and Atmospheric Administration tide data.

* * * * *